United States Patent [19]

Charlton et al.

[11] Patent Number: 5,216,728
[45] Date of Patent: Jun. 1, 1993

[54] OPTICAL FIBER AMPLIFIER WITH FILTER

[75] Inventors: David Charlton; Douglas R. Cole; Douglas W. Hall, all of Corning, N.Y.

[73] Assignee: Corning Incorporated, Corning, N.Y.

[21] Appl. No.: 715,347

[22] Filed: Jun. 14, 1991

[51] Int. Cl.⁵ .................................................. G02B 6/26
[52] U.S. Cl. .................................... 385/27; 385/126; 385/142; 372/6
[58] Field of Search ............... 350/96.20, 96.15, 96.30; 392/6; 385/27, 126, 15, 123, 142; 359/341

[56] References Cited

U.S. PATENT DOCUMENTS

| | | | |
|---|---|---|---|
| 4,515,431 | 5/1985 | Shaw et al. | 350/96.15 |
| 4,765,702 | 8/1988 | Dohan et al. | 385/129 |
| 4,859,016 | 8/1989 | Shaw et al. | 350/96.15 |
| 4,931,076 | 6/1990 | Berkey | 65/4.2 |
| 4,938,556 | 7/1990 | Digonnet et al. | 350/96.15 |
| 4,963,832 | 10/1990 | Desurvire et al. | 359/341 |
| 5,067,789 | 11/1991 | Hall et al. | 385/27 |

FOREIGN PATENT DOCUMENTS

| | | |
|---|---|---|
| 0143561 | 11/1984 | European Pat. Off. . |
| 0425014 | 10/1990 | European Pat. Off. . |
| 0426222 | 10/1990 | European Pat. Off. . |
| 0427320 | 10/1990 | European Pat. Off. . |
| 0497140 | 1/1992 | European Pat. Off. . |
| 2213954 | 8/1989 | United Kingdom . |

OTHER PUBLICATIONS

Linear and non-linear optical fibre devices, Jean-Pierre Goure, Isabelle Verrier and Jean-Pierre Meunier, Journal of Physics D: Applied Physics 22 (1989) Dec. 14, No. 12.

Optical Amplifiers and Their Applications, 1990 Technical Digest Series, vol. 13, Conference Edition, Aug. 6-8, 1990, paper WD1/282, M. Yoshida et al.

Primary Examiner—John D. Lee
Assistant Examiner—Phan T. Heartney
Attorney, Agent, or Firm—William J. Simmons, Jr.

[57] ABSTRACT

Disclosed is a fiber amplifier system including a gain fiber having a single-mode core doped with active dopant ions capable of producing stimulated emission of light at wavelength $\lambda_s$ when pumped with light of wavelength $\lambda_p$. Spliced to the gain fiber is a light-attenuating fiber having a core containing a dopant that attenuates light of wavelength $\lambda_p$ but not $\lambda_s$. The amplifier is conventionally employed in a system including an incoming telecommunication fiber for introducing light of wavelength $\lambda_s$ into an end of the gain fiber, the amplified signal being connected to an outgoing telecommunication fiber. The system further includes a pump source for introducing light of wavelength $\lambda_p$ into an end of the gain fiber. Elements of the system can be arranged for forward pumping, counter pumping and dual ended pumping. Various interconnection schemes are disclosed for forming a series arrangement including the gain fiber, the attenuating fiber and the outgoing fiber.

21 Claims, 3 Drawing Sheets

OPTICAL FIBER AMPLIFIER WITH FILTER

BACKGROUND OF THE INVENTION

The present invention relates to fiber amplifiers having filter means for attenuating or removing unwanted wavelengths and to optical couplers for use in fiber amplifiers and other optical systems.

Doped optical fiber amplifiers consist of a gain optical fiber the core of which contains a dopant such as rare earth ions. Such an amplifier receives an optical signal containing wavelength $\lambda_s$ and a pump signal containing wavelength $\lambda_p$; these signals are coupled to the gain fiber by means such as one or more couplers located at one or both ends of the amplifier. In the absence of an input signal, high levels of pump power can emanate from the gain fiber. Moreover, fiber amplifiers that are based on a three level laser system can radiate remnant pump light even when a signal is present, if they are designed for operation at maximum efficiency. In an Er-doped amplifier, for example, the remnant pump power can be 20 mW or higher when a 980 nm pump source is employed. This level can degrade the performance of the most widely used type of polarization insensitive optical isolators by heating up the YIG crystal of the Faraday rotators. There has been some evidence of destruction of isolators due to interaction of high power levels of light and optical epoxies. Operator safety also requires that 980 pump light be reduced to safe levels. It is therefore desirable to severely attenuate the unwanted pump light while propagating the signal light with essentially no attenuation.

Heretofore, fiber amplifiers have incorporated bulk optic elements such as isolators and filters for the purpose of protecting pump sources. See for example, the publication: M. Yoshida et al, "Development of Compact $Er^{3+}$-doped Fiber Amplifiers for Practical Applications", Topical Meeting of the Optical Society of America on Optical Amplifiers and Their Applications, Aug. 6-8, 1990, pp. 282/WD1-285/WD1. Such bulk optical devices introduce excessive loss and reflection into the system and can be sensitive to environmental conditions.

SUMMARY OF THE INVENTION

An object of the present invention is to provide a fiber amplifier, the output of which consists essentially of signal power. Another object is to provide an optical coupler containing means for eliminating power of undesired wavelengths from an output.

The invention concerns a fiber amplifier including a gain fiber having a single-mode core doped with active dopant ions capable of producing stimulated emission of light at wavelength $\lambda_s$ when pumped with light of wavelength $\lambda_p$. Connected to the gain fiber is a light-attenuating fiber having a core containing a dopant that attenuates light of wavelength $\lambda_p$ but not $\lambda_s$. The amplifier is conventionally employed in a system including an incoming telecommunication fiber for introducing light of wavelength $\lambda_s$ into an end of the gain fiber, the amplified signal being connected to an outgoing telecommunication fiber. The system further includes a pump source for introducing light of wavelength $\lambda_p$ into an end of the gain fiber. Elements of the system can be arranged for forward pumping, counter pumping or dual ended pumping. While this invention is particularly suitable for three level laser systems, it is also useful in other types of laser systems.

Various interconnection schemes can be employed to form a series arrangement including the gain fiber, the attenuating fiber and the outgoing fiber. Low loss splices (less than 0.01 dB) can be made between any two of these fibers if their mode field diameters (MFDs) are substantially matched. However, the MFD of a gain fiber is often relatively small in order to increase the intensities of the pump and signal beams. There is no maximum acceptable MFD for such high gain fibers; however, it should be smaller than the MFD of a standard telecommunication fiber, that difference preferably being larger than 1.5:1.

If the MFD of the gain fiber is smaller than that of the outgoing fiber, the MFD of the attenuating fiber could be intermediate those of the gain fiber and outgoing fiber, and opposite ends of the attenuating fiber could be spliced to the other two fibers.

If the MFDs of the three series connected fibers are not matched, any two of these fibers having unmatched MFDs can be connected by means such as a tapered optical fiber or an optical coupler.

The coupler can be a planar device including a substrate having optical waveguide paths which are sufficiently closely spaced in a coupling region to cause light to couple between them. The substrate can include grooves at the ends of the paths for aligning the paths with optical fiber pigtails which connect the coupler to the fibers of a system. The pigtails can contain dopants that cause them to attenuate selected wavelengths whereby only $\lambda_p$ emanates from the first pigtail and only $\lambda_s$ emanates from the second pigtail.

Alternatively, the coupler may comprise an elongated body of matrix glass having two opposed endfaces and a midregion. First and second coupler fibers extend longitudinally through the body, each of the fibers comprising a core surrounded by a cladding of refractive index less than that of the core but greater than that of the matrix glass. The fibers are fused together along with the midregion of the matrix glass such that their cores are more closely spaced at the central portion of the midregion than at the endfaces, thereby forming the coupling region. Either or both of the first and second coupler fibers can contain a dopant that absorbs light at selected wavelengths, a section of the doped coupler fiber extending a sufficient distance from the second endface of the body for it to constitute a fiber pigtail. The second coupler fiber could be formed of two fiber segments that are fused together within the midregion of the matrix glass, only one of the segments containing a dopant that absorbs light of a selected wavelength. The coupler fibers can have different MFDs so that low loss splices can be made to fibers having different MFDs.

DESCRIPTION OF THE PREFERRED EMBODIMENTS

Figure 1:
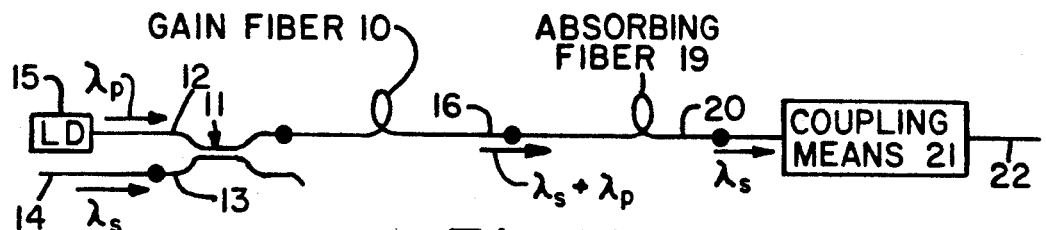
FIG. 1 is a schematic illustration of a fiber amplifier in accordance with the present invention.

Fiber amplifiers, in which useful gain is afforded by the stimulated emission of radiation, typically include a gain fiber 10 (FIG. 1), the core of which includes active dopant ions that are capable of producing stimulated emission of light within a predetermined band of wavelengths including a wavelength $\lambda_s$ when pumped with light of wavelength $\lambda_p$ that is outside the predetermined band. A wavelength division multiplexer (WDM) fiber optic coupler 11 can be used for coupling pump energy of wavelength $\lambda_p$ from laser diode 15 and the signal of wavelength $\lambda_s$ from input telecommunication fiber 14 to gain fiber 10. Such devices are disclosed in U.S. Pat. Nos. 4,938,556, 4,941,726, 4,955,025 and 4,959,837, for example. Fusion splices are represented by large dots in the drawings. Input fiber 14 is spliced to coupler fiber 13, and gain fiber 10 is spliced to coupler fiber 12. Splice losses are minimized when coupler 11 is formed in accordance with the teachings of copending U.S. patent application Ser. No. 671,075 (Hall et al.) filed Mar. 18, 1991 now U.S. Pat. No. 5,179,603 which is incorporated herein by reference.

In the absence of an input signal at fiber 14, high levels of pump light can emanate from fiber 10. Furthermore, some fiber lasers, especially those based on a three level laser system, are pumped at a power level that is sufficiently high that some remnant pump light emanates from the output end of gain fiber 10. In some applications, output end 16 of gain fiber 10 may remain temporarily disconnected. In other applications output end 16 may be connected to a device that can be damaged by pump light. To attenuate such pump light, absorbing fiber 19 is connected to output end 16 of gain fiber 10. The specific absorbing fiber must be tailored to the gain fiber and the pump source. Fiber 19 must sufficiently attenuate light of wavelength $\lambda_p$ that within a relatively short length, i.e. less than 20 m, the pump power at output end 20 of absorbing fiber 19 must be attenuated to a safe level. Furthermore, the absorbing fiber must not unduly attenuate light at wavelength $\lambda_s$. In the embodiment of FIG. 1, signal attenuation in fiber 19 should be less than 0.5 dB.

Gain fibers operate best when intensities of both the pump and signal beams are high. This can be accomplished by providing the gain fiber with a relatively small MFD, a characteristic that causes the optical power to be concentrated in a relatively small area along the fiber axis. Such a "high gain" or "high efficiency" fiber can be achieved by employing a relatively large core/clad $\Delta$ and a relatively small core diameter. There is no maximum acceptable MFD for high gain fibers; however, the MFDs of such fibers should be smaller than the MFDs of standard telecommunication fibers, that difference preferably being larger than 1.5:1.

In the embodiment of FIG. 1, splice loss at the connection between absorbing fiber 19 and gain fiber 10 can be minimized by employing an absorbing fiber having a MFD that is substantially matched to that of fiber 10. However, a mode field mismatch between small MFD fiber 19 and large MFD telecommunication fiber 22 would cause a high insertion loss at the splice between them. Consider, for example, a telecommunication system employing a gain fiber (and thus an absorbing fiber) having MFDs of 6.4 µm at 1550 nm. A splice between that absorbing fiber and a telecommunication fiber having MFD of 10.5 µm at 1550 nm would exhibit a splice loss of about 0.5 dB at 1550 nm. Such splice loss reduces amplifier gain and the useable output power of the amplifier. A relatively low loss connection from the absorbing fiber to outgoing telecommunication fiber 22 can be obtained by employing a coupling means 21 such as a tapering fiber or a suitable fiber optic coupler such as that disclosed in the aforementioned U.S. patent application Ser. No. 671,075 now U.S. Pat. No. 5,179,603.

The erbium-doped optical fiber amplifier is presently being considered for use in communication systems, since its gain band coincides with the telecommunications window of silica fiber at wavelengths around 1.5 µm. If a 980 nm pumping source is employed for the erbium-doped fiber amplifier, absorbing fiber 19 can be doped with ytterbium, for example. Table 1 lists dopant candidates for use in absorbing fibers to be employed in conjunction with gain fibers doped with Er, Nd and Pr.

TABLE 1

| Gain | Wavelength | | Absorbing Ion |
|---|---|---|---|
| Ion | Signal | Pump | or Center |
| Er | 1.52–1.6 µm | 980 nm | Yb, Dy, Pr, V, CdSe |
| Er | 1.52–1.6 µm | 1480 nm | Pr, Sm |
| Er | 1.52–1.6 µm | 800 nm | Nd, Dy, Tm, V, CdSe |
| Nd | 1.25–1.35 µm | 800 nm | Dy, Er, Tm, V, CdSe |
| Pr | 1.25–1.35 µm | 1000 nm | Dy, Er, Yb, V, |

Curves of absorptivity v. wavelength were used in selecting the rare earth ions and the transition metal (vanadium) ion. The CdSe should be present in the absorbing fiber in the form of micro crystallites.

Various fiber fabrication techniques have been employed in the formation of rare earth-doped absorbing optical fibers. The process described below is a modification of a process for forming standard telecommunication fiber preforms. The process can be tailored so that it results in the formation of an absorbing fiber having an MFD that matches the MFD of an outgoing telecommunication fiber, the MFD of a gain fiber, or an MFD intermediate the MFDs of those fibers, depending upon where the absorbing fiber is to be connected into the system.

If too much rare earth dopant is added to a $GeO_2$-doped silica core, the core can crystallize. Such higher rare earth dopant levels can be achieved without crystallization of the core glass by adding $Al_2O_3$ to the core.

It is noted that the entire core/clad region of the absorbing fiber does not need to be doped, but only that portion where considerable 980 nm light is carried. For standard single-mode fiber parameters, approximately 90% of 980 nm light is carried in the core. It may therefore be sufficient to dope only the core or to dope the core and a thin cladding region around the core. For good performance in an erbium-doped fiber amplifier, a target loss at the 1536 nm signal wavelength in a one meter length of fiber is less than 0.05 dB, i.e. the fiber attenuation is 50 dB/km at 1536 nm, a readily achievable goal.

Figure 2:
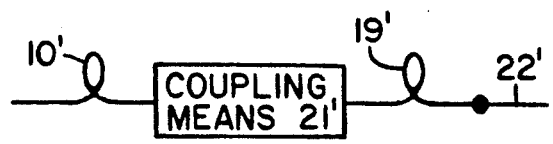
FIGS. 2 and 3 illustrate modifications of the amplifier of FIG. 1.

An alternative arrangement for the placement of the absorbing fiber is shown in FIG. 2 where elements similar to those of FIG. 1 are represented by primed reference numerals. Since the absorbing fiber is spliced to telecommunication fiber 22', the MFDs of those fibers should be substantially matched if the splice loss minimized. Coupling means 21' can be employed to provide a low loss connection between gain fiber 10' and absorbing fiber 19'.

If the absorbing fiber is to be spliced directly to gain fiber 10 and transmission fiber 22 (without coupling means), the MFD of the absorbing fiber should be intermediate the MFDs of the gain and transmission fibers.

Figure 3:
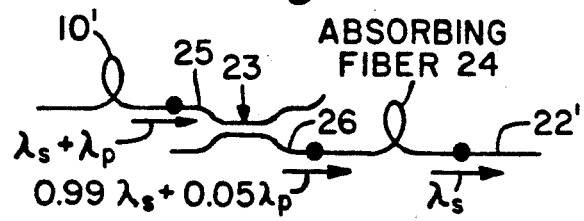

In FIG. 3, the output coupling means comprises a WDM aforementioned Hall et al. patent application Ser. No. 671,075 now U.S. Pat. No. 5,179,603. Of the total power coupled to the input end of coupler fiber 25, 99% of the signal power at wavelength $\lambda_s$ is coupled to the output end of coupler fiber 26, whereas only about 5% of the pump power at wavelength $\lambda_p$ is coupled to fiber 26. Since the coupler severely attenuates the pump power coupled to fiber 22', a relatively short section 24 of absorbing fiber is needed to completely eliminate wavelength $\lambda_p$.

Figure 4:
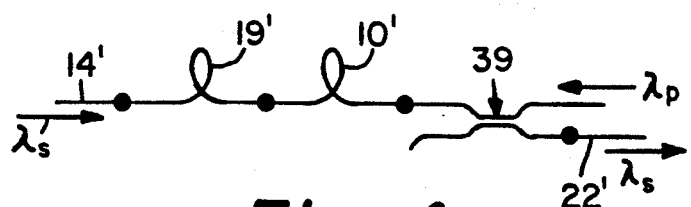
FIGS. 4 and 5 illustrate counter pumping and dual ended devices, respectively.

The light attenuating fiber means of this invention is also useful in fiber amplifiers employing alternate pumping schemes. In the counter-pumping device of FIG. 4, wherein elements similar to those of FIG. 1 are represented by primed reference numerals, gain fiber 10' is connected to input fiber 14' by absorbing fiber 19'. Pumping light of wavelength $\lambda_p$ is coupled to gain fiber 10' by coupler 39 which also couples the amplified signal to output fiber 22'. In this embodiment, the absorbing fiber removes pump light that would propagate through fiber 14' toward the signal source.

Figure 5:
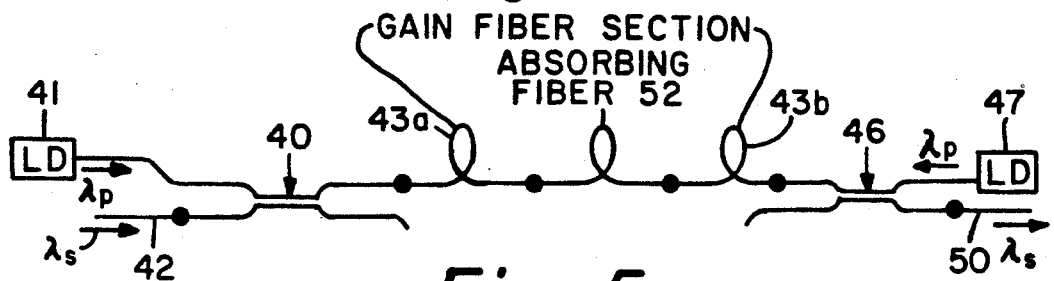

In the dual-ended device of FIG. 5, coupler 40 couples the signal from input telecommunication fiber 42 and pumping power from first pump source 41 to gain fiber section 43a, as described in conjunction with FIG. 1. Coupler 46 couples pumping power from second pump source 47 to gain fiber section 43b. The output signal of wavelength $\lambda_s$ is coupled by coupler 46 from gain fiber section 43b to outgoing telecommunication fiber 50. Absorbing fiber 52, the MFD of which substantially matches that of the gain fiber, is spliced between the two gain fiber sections. In the absence of the absorbing fiber, remnant pump light from source 41 would be coupled from the gain fiber to source 47 by coupler 46, thereby adversely affecting the operation of pump source 47. The absorbing fiber similarly protects pump source 41 from light supplied to the gain fiber from source 47.

The signal is first introduced into section 43a where it slowly increases in amplitude due to amplification in that section. The amplitude of the signal that is introduced into section 43b is therefore much greater that that which was introduced into section 43a. The pump power is therefore absorbed at a greater rate per unit length in section 43b, and section 43b can be shorter than section 43a.

A ytterbium-doped absorbing fiber suitable for use in conjunction with an erbium-doped fiber amplifier was made by a process similar to that disclosed in U.S. patent application Ser. No. 07/715,348 now U.S. Pat. No. 5,179,603 (Bartholomew et al.18-1) filed on even date herewith, which is incorporated herein by reference. A first coating of glass particles comprising $SiO_2$ doped with 9.7 wt. % $GeO_2$ was deposited on a tapered mandrel having an average diameter of about 6 mm. A very thin coating of $SiO_2$ particles was deposited on the first coating to form a porous preform having a length of about 70 cm, a diameter of about 6.3 cm, and a density of about 0.41 g/cc. The porous preform was cooled, removed from mandrel and immersed beaker containing 1000 ml. of solution composed of acetone in which was dissolved 1 gram of ytterbium nitrate. The Yb-doped porous preform was dried and then gradually inserted into a consolidation furnace muffle, where it was dehydrated and consolidated. A maximum temperature of about 1490° C. occurred in the central longitudinal region of the muffle as taught in U.S. Pat. No. 4,165,223, which is incorporated herein by reference. During the consolidation process, a gas mixture containing 70 sccm (standard cubic centimeter per minute) chlorine and 1200 sccm helium flowed into the center hole from which the mandrel had been removed. A flushing gas containing 40 lpm (liter per minute) helium flowed upwardly from the bottom of the muffle. The consolidated preform was placed in a draw furnace where its aperture was evacuated. The lower end of the tubular body was heated to about 1900° C. and drawn to form a 5 mm solid glass core rod which was severed to form sections. One of the sections was supported in a lathe where it functioned as a mandrel upon which a 53.3 mm outside diameter coating of $SiO_2$ cladding soot was deposited. The resultant final porous preform was gradually inserted into a consolidation furnace muffle having a maximum temperature of about 1490° C. where it was consolidated to form a draw blank. During the consolidation process, a gas mixture containing 20 slpm helium and 200 sccm chlorine flowed through the muffle. The draw blank was drawn to form a fiber having an outside diameter of 125 $\mu$m. The fiber was coated with a 250 $\mu$m diameter urethane acrylate coating during drawing.

Figure 6:
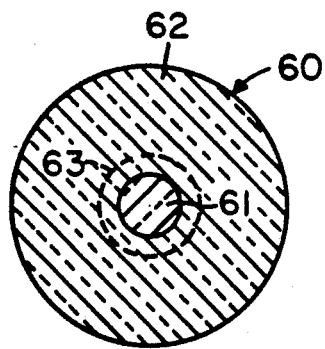
FIG. 6 is a cross-sectional view of an absorbing fiber.

The resultant fiber 60 is shown in cross-section in FIG. 6. The effective step index radius of core 61 was 4.1 $\mu$m. The maximum core $\Delta$ was 0.00554, and the effective step index $\Delta$ was 0.0044. The average concentration of $Yb_2O_3$ in the Yb-doped region of the fiber was 870 ppm (290 ppm $Yb^{3+}$). The radius of the $Yb_2O_3$-doped region of the fiber is represented by dashed line 53. The presence of $Yb_2O_3$ in that region of cladding 62 surrounding core 61 increases the attenuation of fiber 60 since a small portion of the power is propagated in that region of the fiber.

Figure 7:
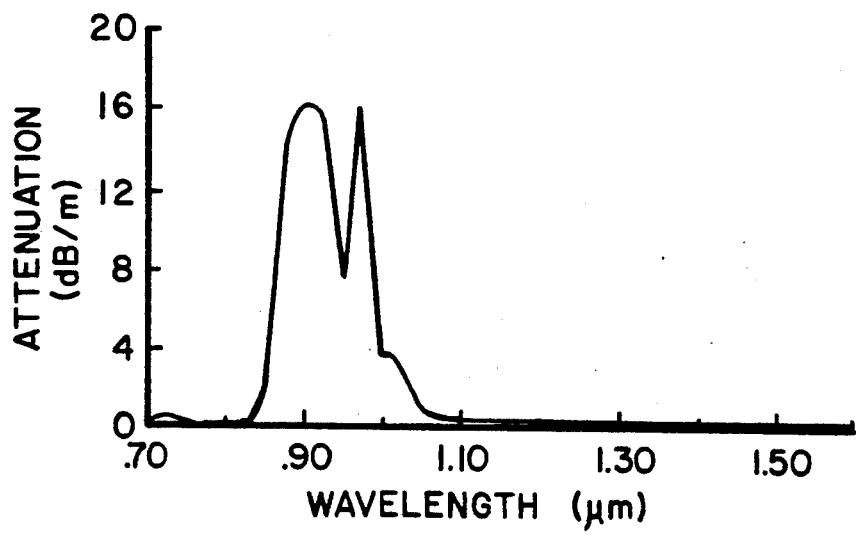
FIG. 7 is a spectral attenuation curve of a Yb-doped fiber.
Figure 8:
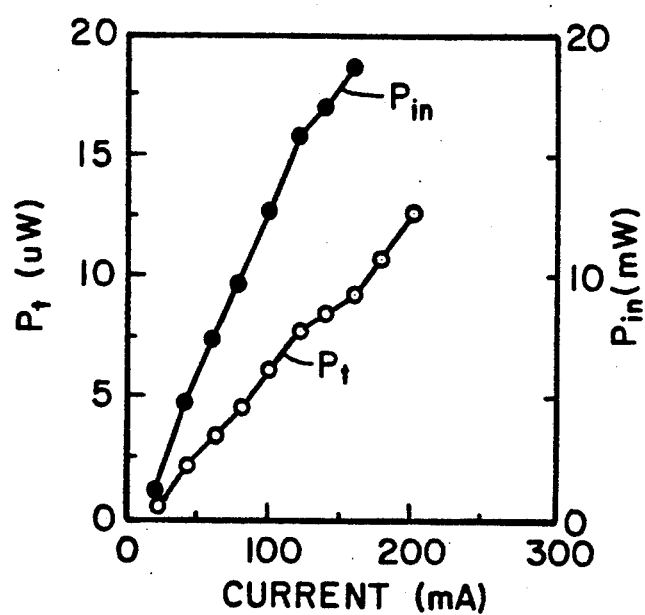
FIG. 8 is a graph illustrating the transmission of a 10 m length of Yb-doped fiber at different levels of 980 nm input power.

The spectral attenuation of the ytterbium-doped fiber is shown in FIG. 7. Whereas the attenuation is about 16 dB/m at the 980 nm pump wavelength, it is less than 0.01 dB/m at signal wavelengths around 1.5 $\mu$m. The transmission of a 10 m length of fiber at different levels of 980 nm input power is shown in FIG. 8. The abscissa represents the current supplied to the light source coupled to the input end of the measured fiber. At an input power level ($P_{in}$) of about 20 mW, the output power ($P_t$) from the 10 m length of fiber was less than 20 $\mu$W. This shows that the absorption of ytterbium is still significant and does not bleach even when relatively high levels of 980 nm light propagate in the fiber.

In a fiber amplifier in which a 10 m length of Yb-doped absorbing fiber was spliced between an Er-doped gain fiber and a telecommunication fiber, the measured insertion loss at the signal wavelength $\lambda_s$ for the Yb fiber and both splices was 0.5 dB. The MFD mismatch at the splice between the Er and Yb fibers was about 1:2, and the MFD of the Yb fiber substantially matched that of the telecommunication fiber.

This is to be compared with the use of bulk optics, e.g. a color glass filter where the collimation optics at both ends of the filter typically introduces a total loss of 0.5 dB, and additional loss occurs due to reflection from the filter surfaces and impurities of the filter glass.

Figure 9:
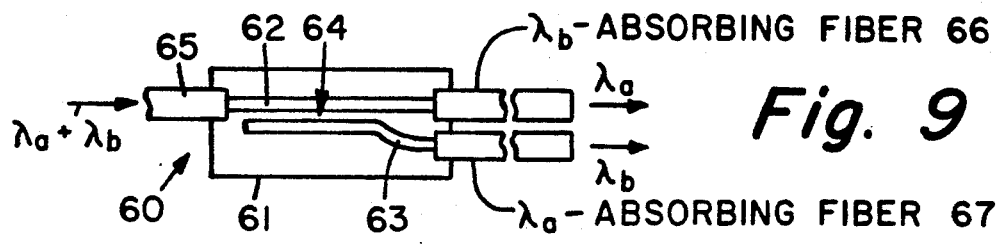
FIGS. 9 and 10 are schematic illustrations of optical couplers having absorbing fibers associated therewith.

The absorbing fiber-coupler combination described in conjunction with FIG. 3 is useful for eliminating undesirable light from both output legs of optical waveguide couplers. FIG. 9 shows a planar coupler 60 of the type disclosed in U.S. Pat. No. 4,765,702. Substrate 61 includes grooves or the like for aligning optical fiber pigtails with optical waveguide paths 62 and 63 which are sufficiently closely spaced in coupling region 64 to cause light to couple between them. Fiber pigtails are short lengths of optical fiber, often about 1 m in length, that are bonded to the substrate for the purpose of connecting the coupler to the fibers of a system. The optical characteristics of the paths, the length of the coupling region and the spacing between paths in the coupling region can be controlled such that of two wavelengths $\lambda_a$ and $\lambda_b$ introduced into path 62 from fiber pigtail 65, at least 99% of one input wavelength $\lambda_a$ continues propagating in path 62 and 99% of $\lambda_b$ couples to path 63. As indicated above, it may be undesirable for the remaining 1% of wavelengths $\lambda_a$ and $\lambda_b$ to propagate in fiber pigtails 67 and 66, respectively. This undesirable occurrence can be prevented by forming coupler 60 in such a manner that fiber pigtails 66 and 67 absorb power of wavelengths $\lambda_b$ and $\lambda_a$, respectively.

The above-described coupler is currently of interest in telecommunication systems in which the coupler must split signals at 1300 nm and 1550 nm. The dopants Pr, Sm, Er and combinations thereof absorb 1550 nm light while transmitting 1300 nm light, and the dopants Dy and V absorb 1300 nm light and transmit 1550 nm light.

Figure 10:
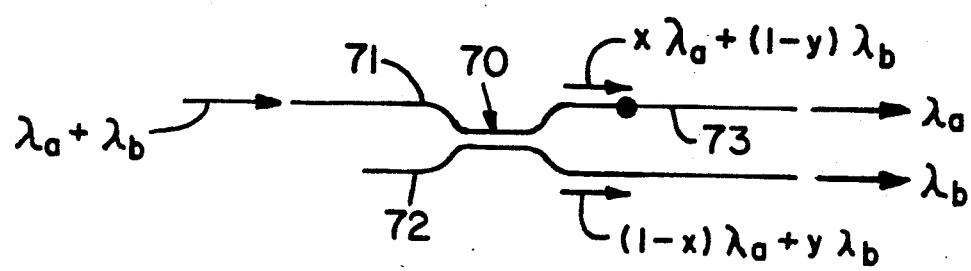

This design is also applicable to overclad optical fiber couplers of the type disclosed in U.S. Pat. Nos. 4,931,076 and 4,979,972 and fused biconical couplers of the type disclosed in U.S. Pat. Nos. 4,377,403 and 4,426,215 which are schematically represented as coupler 70 of FIG. 10. Of the total power $(\lambda_a + \lambda_b)$ coupled to the input end of coupler fiber 71, $x\lambda_a$ continues to propagate to the output end of coupler fiber 71, and $y\lambda_b$ is coupled to coupler fiber 72, where x and y represent nearly all of the power at those wavelengths. Only $(1-x)$ of the power at wavelength $\lambda_a$ is coupled to fiber 72 and $(1-y)$ of the power at wavelength $\lambda_b$ propagates to the output end of coupler fiber 71. Coupler fiber 72 is an absorbing fiber that severely attenuates light at wavelength $\lambda_a$ while propagating light at wavelength $\lambda_b$. Absorbing coupler fiber 72 extends a sufficient distance from coupler 70 to function as the pigtail fiber. If power at $\lambda_a$ is also to be obtained from the coupler, a short length 73 of absorbing fiber can be fused to the output end of coupler fibers 71. Fiber 73 severely attenuates light at wavelength $\lambda_b$ while propagating light at wavelength $\lambda_a$ with essentially no attenuation. In standard couplers, x and y are at least 99% and (x−1) and (y−1) are no larger than 1%. Since only relatively small amounts of unwanted power appear at the output ends of the coupler fibers, relatively short lengths of absorbing fiber are needed to completely eliminate the undesired wavelengths. The splice between coupler fiber 71 and absorbing fiber fiber 73 is made as close as possible to the coupler, and the absorbing fiber functions as the coupler pigtail.

Figure 11:
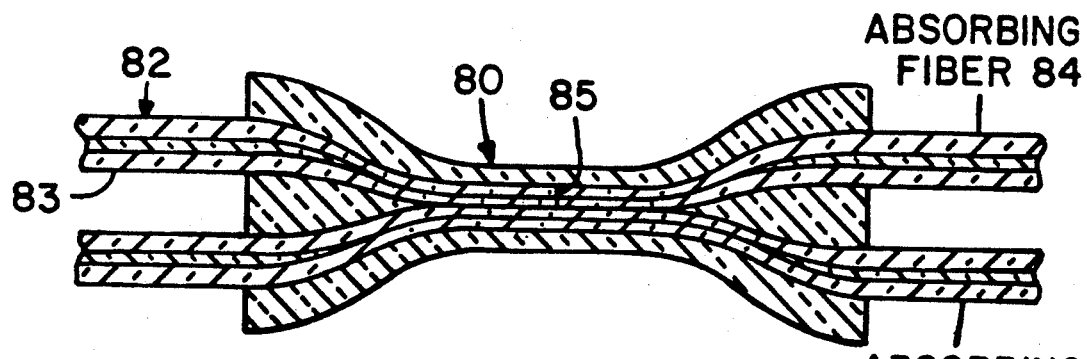
FIG. 11 is a cross-sectional view of a fiber optic coupler that is formed of absorbing fibers.

The splice loss between coupler fiber 71 and absorbing fiber 73 can be essentially eliminated by employing coupler 80 of FIG. 11. Coupler fiber 81 absorbs wavelength $\lambda_a$. Coupler fiber 82 is formed of two optical fibers 83 and 84 which are spliced within the necked down portion of the coupler at interface 85. Fiber 84 absorbs wavelength $\lambda_b$.

We claim:

1. A fiber optic amplifier comprising a gain optical fiber having a single-mode core doped with active dopant ions capable of producing stimulated emission of light within a predetermined band of wavelengths including a wavelength $\lambda_s$ when pumped with light of wavelength $\lambda_p$, $\lambda_p$ being outside said band of wavelengths including $\lambda_s$, light-attenuating fiber means having a core containing a dopant that attenuates optical power in at least one wavelength band including said wavelength $\lambda_p$, without significantly attenuating optical power at said wavelength $\lambda_s$, and coupling means for connecting said gain fiber in series with said light-attenuating fiber means.

2. An amplifier in accordance with claim 1 wherein the core of said light attenuating fiber means comprises an inner region composed of a base glass and a refractive index increasing dopant, said core further comprising an attenuating region surrounding said inner region, said attenuating region being composed of said base glass and a light attenuating dopant.

3. An amplifier in accordance with claim 1 wherein the mode field diameter of said light-attenuating fiber means is substantially matched to that of said gain fiber.

4. An amplifier in accordance with claim 1 wherein the mode field diameter of said light attenuating fiber means is greater than that of said gain fiber, and said coupling means comprises a tapered optical fiber.

5. An optical signal coupler comprising
an elongated body of matrix glass having a refractive index $n_3$, said body having two opposed endfaces and a midregion,
first and second coupler fibers extending longitudinally through said elongated body, each of said fibers having a core surrounded by a cladding of refractive index less than that of said core but greater than $n_3$, said fibers being fused together along with the midregion of said matrix glass, the cores of said optical fibers being more closely spaced at the central portion of said midregion than at said endfaces, thereby forming a coupling region in which optical power couples between said fibers, the coupling being wavelength dependent whereby most of the light power of wavelength $\lambda_s$ propagating in said first fiber couples to said second fiber, and most of the light power of a wavelength $\lambda_p$ that is introduced into said first fiber remains in said first fiber, said second fiber containing a dopant that absorbs light of wavelength $\lambda_p$.

6. A coupler in accordance with claim 5 wherein said second coupler fiber comprises two fiber segments that are fused together within the midregion of said matrix glass, one of said segments containing a dopant that absorbs light of wavelength $\lambda_p$.

7. A coupler in accordance with claim 5 wherein the mode field diameter of said second coupler fiber is smaller than that of said first coupler fiber.

8. A coupler in accordance with claim 5 further comprising a fiber pigtail spliced to one end of said first coupler fiber, said pigtail containing a dopant that absorbs light of wavelength $\lambda_s$.

9. A fiber optic amplifier system comprising
a gain optical fiber having a single-mode core doped with active dopant ions capable of producing an amplified signal within a predetermined band of wavelengths including a wavelength $\lambda_s$, in response to an input signal, when pumped with light of wavelength $\lambda_p$,
input signal means for introducing light power of wavelength $\lambda_s$ into an end of said gain fiber,
pump source means for introducing pumping light power of wavelength $\lambda_p$ into an end of said gain fiber, $\lambda_p$ being outside said band of wavelengths including $\lambda_s$,
light-attenuating fiber means having a core containing a dopant that attenuates optical power in at least one wavelength band containing wavelength $\lambda_p$, without significantly attenuating optical power at wavelength $\lambda_s$, and
coupling means for connecting said light-attenuating fiber means in series with that end of said gain fiber opposite said pump source means.

10. An amplifier in accordance with claim 9 wherein said gain fiber has first and second ends, said signal source means being coupled to the first end of said gain fiber, said coupling means being a splice between said light attenuating fiber means and the second end of said gain fiber, and fiber optic coupler means having a first coupler fiber, one end of which is spliced to said light attenuating fiber means, said coupler means having a second coupler fiber for coupling said amplified signal to an outgoing telecommunication fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first coupler fiber remains in said first coupler fiber.

11. An amplifier in accordance with claim 10 wherein the mode field diameter of said first coupler fiber is substantially matched to that of said gain fiber means and is smaller than that of said second coupler fiber.

12. An amplifier in accordance with claim 9 wherein said gain fiber has first and second ends, said coupling means being a splice between an end of said light attenuating fiber means and the first end of said gain fiber, said signal source means being coupled to that end of said light attenuating fiber means opposite said gain fiber, and fiber optic coupler means having a first coupler fiber, a first end of which is spliced to the second end of said gain fiber and the second end of which is coupled to said pump source means, said coupler means having a second coupler fiber for connection to an outgoing telecommunication fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first coupler fiber remains in said first coupler fiber.

13. An amplifier in accordance with claim 12 wherein the mode field diameter of said first coupler fiber is substantially matched to that of said gain fiber means and is smaller than that of said second coupler fiber.

14. An amplifier in accordance with claim 9 wherein said coupling means is a splice between an end of said light attenuating fiber means and an end of said gain fiber, said amplifier further comprising an outgoing telecommunication fiber that is spliced to said light attenuating fiber means, the mode field diameter of said light attenuating fiber means being intermediate those of said gain fiber and said outgoing telecommunication fiber.

15. An amplifier in accordance with claim 9 wherein said gain fiber comprises an optical fiber having a Er-doped core, said light attenuating fiber means comprises an optical fiber having a Yb-doped core, $\lambda_p$ is 980 nm and $\lambda_s$ is a wavelength within the band between about 1525 and 1560 nm.

16. A fiber optic amplifier comprising a gain optical fiber having a single-mode core doped with active dopant ions capable of producing stimulated emission of light within a predetermined band of wavelengths including a wavelength $\lambda_s$ when pumped with light of wavelength $\lambda_p$, light-attenuating fiber means having a core containing a dopant that attenuates optical power in at least one wavelength band including said wavelength $\lambda_p$, without significantly attenuating optical power at said wavelength $\lambda_s$, the mode field diameter of said light attenuating fiber means being greater than that of said gain fiber, and coupling means for connecting said gain fiber to said light-attenuating fiber means, said coupling means comprising an optical coupler having first and second coupler fibers, the mode field diameter of said first coupler fiber substantially matching that of said gain fiber and the mode field diameter of said second coupler fiber substantially matching that of said light attenuating fiber means, said gain fiber being fused to said first coupler fiber and said light attenuating fiber means being fused to said second coupler fiber.

17. A fiber optic amplifier comprising a gain optical fiber having a single-mode core doped with active dopant ions capable of producing stimulated emission of light within a predetermined band of wavelengths including a wavelength $\lambda_s$ when pumped with light of wavelength $\lambda_p$, light-attenuating fiber means having a core containing a dopant that attenuates optical power in at least one wavelength band including said wavelength $\lambda_p$, without significantly attenuating optical power at said wavelength $\lambda_s$, the mode field diameter of said light attenuating fiber means being greater than that of said gain fiber, and coupling means for connecting said gain fiber to said light-attenuating fiber means, said coupling means comprising an optical coupler having at least one input pigtail and at least one output pigtail, said input pigtail being fused to said gain fiber and said light attenuating fiber means constituting said output pigtail.

18. A fiber optic amplifier comprising a gain optical fiber having a single-mode core doped with active dopant ions capable of producing stimulated emission of light within a predetermined band of wavelengths including a wavelength $\lambda_s$ when pumped with light of wavelength $\lambda_p$, light-attenuating fiber means having a core containing a dopant that attenuates optical power in at least one wavelength band including said wavelength $\lambda_p$, without significantly attenuating optical power at said wavelength $\lambda_s$, the mode field diameter of said light attenuating fiber means being greater than that of said gain fiber, and coupling means for connecting said gain fiber to said light-attenuating fiber means, said coupling means comprising an optical coupler having first and second coupler fibers that are closely spaced along a portion of their lengths to form a coupling region in which optical power couples between said fibers, said first coupler fiber being fused to said gain fiber, said light attenuating fiber means constituting the second coupler fiber.

19. A fiber optic amplifier comprising a gain optical fiber having a single-mode core doped with active dopant ions capable of producing stimulated emission of light within a predetermined band of wavelengths including a wavelength $\lambda_s$ when pumped with light of wavelength $\lambda_p$, said gain fiber comprising first and second gain fiber sections, each section having first and second ends, light-attenuating fiber means having a core containing a dopant that attenuates optical power in at least one wavelength band including said wavelength $\lambda_p$, without significantly attenuating optical power at said wavelength $\lambda_s$, coupling means for connecting said gain fiber to said light-attenuating fiber means, said coupling means comprising splices respectively connecting the ends of said light attenuating fiber means to said second ends of said gain fiber sections, and means for introducing pump power into the first end of each of said gain fiber sections.

20. An optical signal coupler comprising a substrate having a surface containing at least first and second optical waveguide paths which are sufficiently closely spaced along a sufficiently long coupling region to cause light to couple between said paths, the coupling being wavelength dependent whereby most of the light power of wavelength $\lambda_s$ that is introduced into said first path couples to said second path, and most of the light power of a wavelength $\lambda_p$ that is introduced into said first path remains in said first path, and first and second optical fiber pigtails secured to said substrate and optically aligned with said first and second paths, respectively, so that light propagating in said first and second paths also propagates in said first and second pigtails, respectively, said second fiber pigtail containing a dopant that absorbs light of wavelength $\lambda_p$.

21. A coupler in accordance with claim 20 wherein said first fiber pigtail contains a dopant that absorbs light of wavelength $\lambda_s$.

* * * * *